United States Patent [19]

Federmann et al.

[11] Patent Number: 4,900,922
[45] Date of Patent: Feb. 13, 1990

[54] ARRANGEMENT OF A LIGHT WAVE CONDUCTOR-PHASE SENSOR FOR THE MEASUREMENT OF MINUTE ELONGATIONS

[75] Inventors: Helmut Federmann, Bergisch Gladbach; Friedrich K. Levacher, Brauweiler; Georg Noack, Bergisch Gladbach; Anton Kraus, Overath, all of Fed. Rep. of Germany

[73] Assignee: Felten & Guilleaume Energietechnik Aktiengesellschaft, Cologne, Fed. Rep. of Germany

[21] Appl. No.: 330,861

[22] Filed: Mar. 6, 1989

[30] Foreign Application Priority Data

Mar. 5, 1988 [DE] Fed. Rep. of Germany ....... 3807306

[51] Int. Cl.$^4$ .......................... H01J 5/16; H01J 40/14
[52] U.S. Cl. ................................. 250/227; 250/231 R
[58] Field of Search ................... 250/227, 231 R, 225, 250/231 P; 73/705, 800

[56] References Cited

U.S. PATENT DOCUMENTS 3,898,454 8/1975 Friday et al. ..................... 250/231 P Primary Examiner—David C. Nelms
Assistant Examiner—William Oen
Attorney, Agent, or Firm—Michael J. Striker

[57] ABSTRACT

To measure exactly minute elongations, for example on airplanes or bridge structures by means of a light wave conductor-phase sensor, the measuring beams of polarized light at the output of the sensor is divided by means of a beam divider into three partial light beams. The first partial light beam is directly received by a first light receiver; the second light beam is transmitted through a quarter wavelength plate and an analyzer to the second light receiver; and a third partial light beam is transmitted through an analyzer to the third light receiver. The electrical output signals from the light receivers carry information about extreme refraction values of the measuring light beam and are supplied to an electronic evaluation circuit.

7 Claims, 2 Drawing Sheets

ARRANGEMENT OF A LIGHT WAVE CONDUCTOR-PHASE SENSOR FOR THE MEASUREMENT OF MINUTE ELONGATIONS

BACKGROUND OF THE INVENTION

The present invention relates to an arrangement of a light wave conductor-phase sensor for measuring minute elongations, wherein a source of polarized light is coupled to one end of the sensor-light wave conductor (polarization preserving, doubly refracting monomer-light wave conductor) and a change in the phase difference resulting from the change in length of the light wave conductor-sensor is detected. In principle, the arrangement of this invention consists of the following series connected component parts: a polarized light emitter, transmission light wave conductor, light wave conductor-phase sensor (or subassembly containing the sensor-light wave conductor), another transmission light wave conduit, light receiver and an electronic measuring or evaluation device, according to U.S. patent application Ser. No. 116,032, the entire disclosure of which is incorporated herein by reference.

With a measuring device of this kind deformations in the range of micrometers can be detected. As a light wave conductor-phase sensor the following subassembly of a series connected components has been used: a polarizer, a coupling, a polarization preserving, doubly refracting mono-mode light wave conductor (or sensor-light wave conductor) and an analyzer. In the prior art light wave conductor-sensor the linearly polarized light is coupled in and a change in the phase difference occurring due to a change in length of the sensor-light wave conductor is detected by a light receiver and evaluated by a subsequent electronic measuring circuit. However, it is desirable to further improve the determination of the measuring values.

For example, the connection between light wave conductor LWC-phase sensors arranged in breaking susceptible zones of a structure, and a measuring device arranged in a control room has been made by transmission light wave conductors when specific properties of light wave conduits such as insensitivity to electromagnetic interference fields, to strong electrical fields and to corrosive or explosive environment are desirable. Nevertheless, still other types of connections and conduits may be desired.

SUMMARY OF THE INVENTION

It is therefore an object of this invention to provide an arrangement of a light wave conductor-phase sensor which is capable of a more exact determination of measured values.

Another object of this invention is to secure the possibility of other types of connections between the LWC-phase sensors and the electronic measuring device.

In keeping with these objects and others which will become apparent hereafter, one feature of this invention resides in the provision of three light receivers whereby the light beam at the output of the LWC-sensor is divided by means of a beam divider into three partial light beams of which a first partial beam is directly transmitted to an assigned light receiver, the second light beam is transmitted through a quarter wave length ($\lambda/4$) plate and a polarized light analyzer, and third partial light stream is transmitted through a further polarized light analyzer to the assigned light receivers. In one embodiment, the polarized light transmitter and receiver are integrated in the measuring device and optical conductors (light wave conductors) provide a connection to the phase sensor. In another embodiment the light transmitter and the light receivers are integrated in the light wave conductor-phase sensor and the connection to the measuring device is made by means of electrical (copper) conductors.

With advantage the three-beam divider can be made in the form of an optical block provided that a sufficiently strong light source is employed. Alternatively, a grating with a preceding self-focusing lens is employed as the beam divider. In the case of the dividing optical block the partial light beams are coupled out into three clustered or focused light wave conduits and transmission channels to the respective light receivers are made by three transmission light wave conduits. When a grating is used as the beam divider, the transmission takes place through the air.

In the first light receiver, light intensity $I_0$ is detected. In the second light receiver the intensity $I_2 = \frac{1}{2}I_0(1 + \sin \delta)$, and in the third light receiver the light intensity $I_3 = \frac{1}{2}I_0(1 + \cos \delta)$ are determined. The intensity value $I_2$ is necessary because the function $1 + \cos \delta$ in the range from 0 to $\pi$ is ambiguous. By the provision of the function $1 + \sin \delta$ a non-ambiguous or one valued determination over the signs $+/-$ is achieved. As a consequence in the subsequent electronic measuring and evaluating apparatus an exact determination of the measured values can be achieved, thus obtaining the essential advantage of this invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
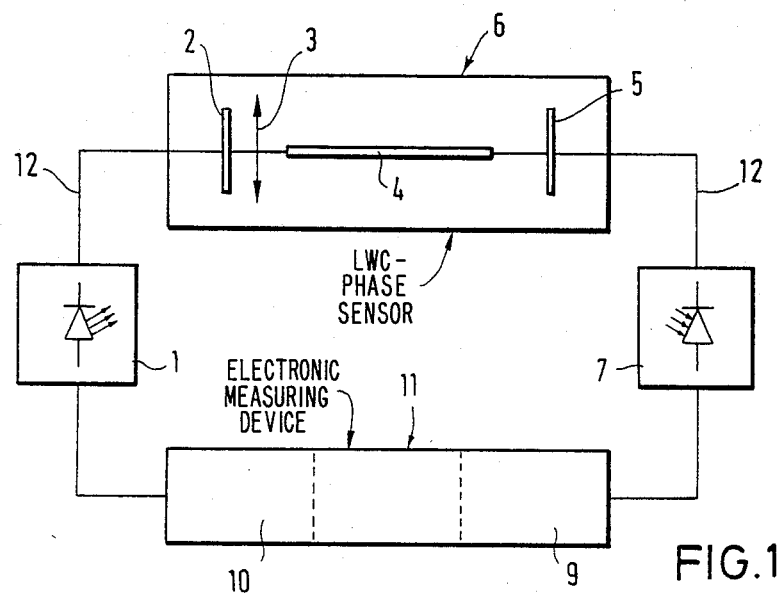
FIG. 1 is a schematic block circuit diagram of a prior art arrangement of a light wave conduit-phase sensor including a single light receiver integrated with an electronic measuring device and being connected to the sensor via a light conduit.

FIG. 1 shows in a block circuit diagram the LWC-phase sensor in connection with a measuring device according to the beforementioned U.S. patent application Ser. No. 116,032. It includes a light emitter 1, a LWC-phase sensor 6 attached to an object to be monitored, a light receiver 7 and a measuring device 9 through 11 arranged in a separate control room. In practice the light emitter and the light receiver are integrated with the measuring device 9 through 11. The connection between the measuring device and the LWC-phase sensor consists of light wave conduits 12.

Figure 2:
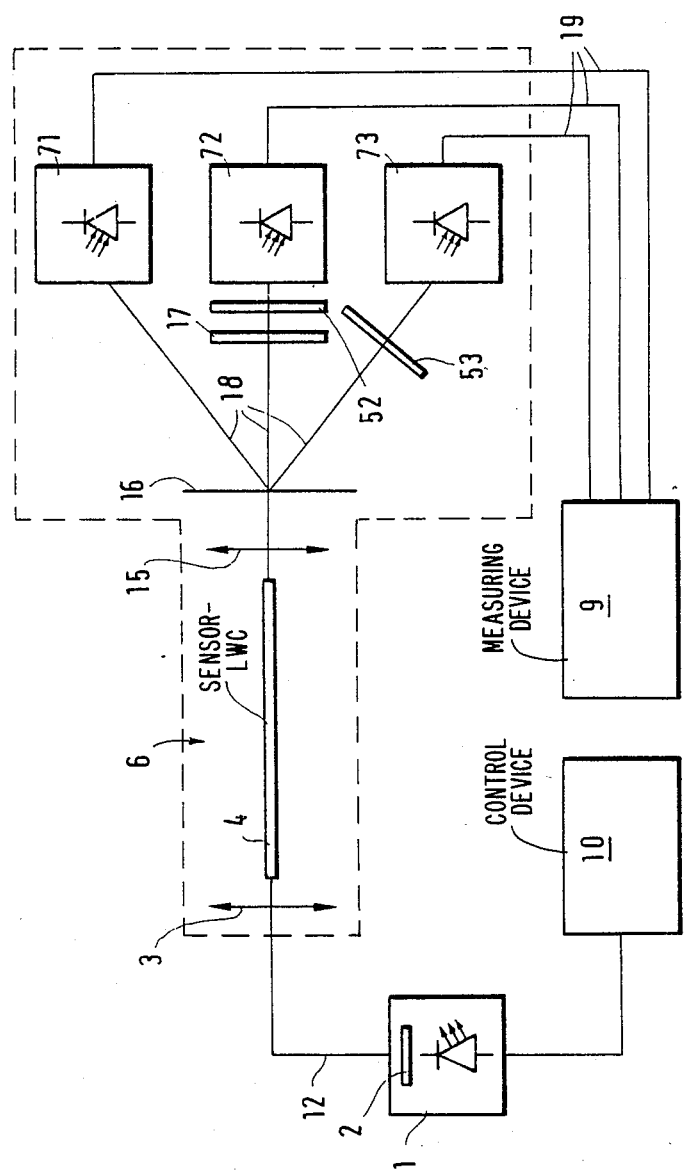
FIG. 2 is a block circuit diagram of the arrangement of this invention including three light receivers integrated with the LWC-phase sensor and being connected to an electronic measuring device by a three wire copper cable while the polarized light transmitter is coupled to the sensor via a transmission light wave conductor.

FIG. 2 illustrates an embodiment according to this invention for achieving an improved determination of measured values. It includes three light receivers or photodiodes 71 to 73. The photodiodes are integrated with LWC-phase sensor 6 into a single structural unit and its connection with the remote measuring device 9 consists of a three wire cable including three cooper wires 19.

The division of the polarized light beam (measuring light beam) at the output of the LWC-sensor 4 is made by means of a combination of a self-focusing lens 15 arranged at the output of the LWC-sensor 4 and the subsequent grating 16 in which the measuring light beam is divided into three partial light beams 18 which are transmitted through air toward respective light receivers 71 to 73. A first partial light beam is transmitted directly to the receiver 71; the second partial light beam is transmitted through a transmission channel including a quarter wavelength ($\lambda/4$). plate 17 and a polarized light analyzer 52; and the third partial light beam passes through a transmission channel including polarized light analyzer 53. The analyzers and the quarter wavelength plate are used for filtering out the two extreme refraction values of the polarized light at the output of the LWC-sensor 4.

The above discussed intensities $I_0$, $I_2$ and $I_3$ of partial light beams received and detected by light receivers 71 through 73 are converted into corresponding electrical signals whose evaluation provides an exact determination of the phase change of the measuring light beam.

With advantage, instead of the grating and the associated self-focussing lens 15, it is possible to employ a non-illustrated optical beam dividing block including three light wave conductors clustered or coupled to the measuring light beam at the output of the LWC-sensor 4. The guiding of the partial light streams 18 through the respective light receivers 71 to 73 is effected by the three clustered or focussed light wave conductors. All remaining component parts remain unchanged. In FIGS. 1 and 2 the reference numeral 3 denotes a polarized light coupler (a plug connector). The reference numerals 2 and 5 in FIG. 1 denote respectively a polarizer and a polarized light analyzer.

Figure 3:
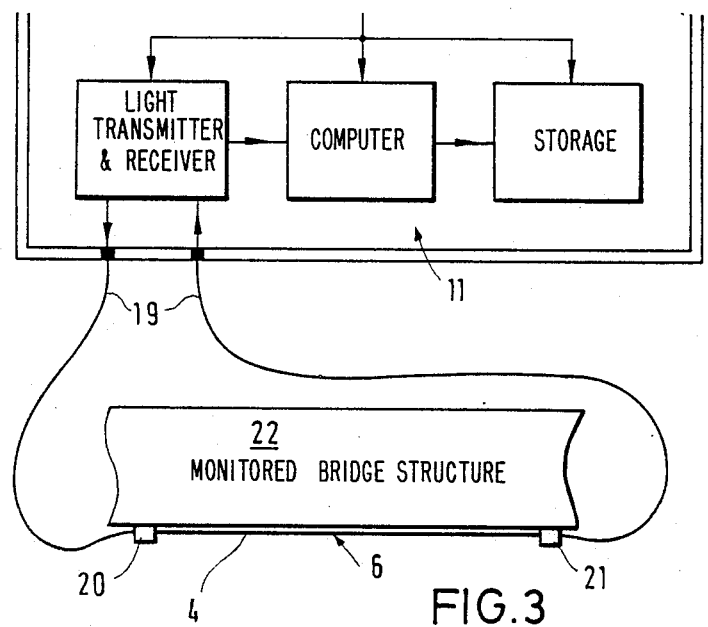
FIG. 3 is a schematic representation of another arrangement of this invention for monitoring a part of a bridge structure whereby the connection between the LWC-phase sensor and a remote measuring device is affected by means of copper conduits.

Referring to FIG. 3 there is illustrated an arrangement of a LWC-phase sensor 6 attached to a part 22 of a bridge structure to be monitored in a control room including an electronic measuring device 11. In this embodiment the connection between the measuring device 11 and the sensor 6 is affected by copper conduits 19.

The LWC-phase sensor 6 is in accordance with FIG. 2 designed as follows: the input end of the LWC-sensor 4 is enclosed in a small parallelepiped housing 20 which also encloses the plug connector or the conductor 19, a laser diode 1, a polarized 2 and a coupler 3. If the light emitter 1 transmits polarized light then the polarizer 2 is eliminated. The length of sides of the input housing 20 is in the range of centimeters. The LWC-sensor 4 is embedded in a plastic and extends over the distance in the range of meters. The output end of the sensor is coupled to a similar output housing 21 enclosing the beam divider 15, 16, the photodiodes 71 to 73, the analyzers 52 and 53, the quarter wave length plate 17 and the connector. The entire light wave conduit-phase sensor assembly is with advantage preliminarily mounted on a light supporting rail.

The electrical conductors 19 lead to a measuring device 11 enclosed in a protective housing. In particular, the measuring device includes electrical control circuits 10 for light transmitters and light receivers, from which the electrical signals from respective light receivers are supplied into evaluation device 9 constituted by a computer and an electrically programmed read-only memory (EPROM). The electrical units are power supplied from a battery via a stabilizing network. The computer can be further connected to an additional memory for evaluated values or to a printer.

While the invention has been illustrated and described as embodied in specific measuring arrangements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement of a light wave conductor-phase sensor for measuring minute elongations, comprising a series connection of an emitter of polarized light, a light wave conductor-phase sensor, a light beam divider for dividing the measuring light beam at the output of the sensor into three partial light beams, three light receivers for receiving respective partial light beams and generating electrical output signals corresponding to received light intensities, a first partial light beam being transmitted to the first light receiver via a direct transmission channel, a second partial light beam being transmitted to the second light receiver via a transmission channel including a quarter wave length ($\lambda/4$) plate and a light analyzer, and the third partial light beam being transmitted to the third light receiver via a transmission channel including a light analyzer, and electrical measuring means for evaluating said electrical output signals.

2. An arrangement as defined in claim 1 wherein said light beam divider includes a self-focussing lens associated with a grating to divide the measuring light beam into said partial light beams and to transmit the same through air to the respective light receivers.

3. An arrangement as defined in claim 1 wherein said light beam divider includes an optical block provided with three clustered transmission light wave conductors coupled to the measuring light beam and transmitting said partial light beams to the respective light receivers.

4. An arrangement as defined in claim 1 wherein said light emitter and said light receivers are integrated with said light wave conductor-phase sensor and connected to said measuring means by electrical conductors.

5. An arrangement as defined in claim 1 wherein said light emitter and said light receivers are integrated with said electronic measuring means and connected to said light wave conductor-phase sensor by light wave conductors.

6. An arrangement as defined in claim 5 comprising an elongated sensor light wave conductor embedded in plastics and attachable to a structural part to be monitored, a relatively small metal housing of a parallelepiped configuration arranged at an input end of said sensor light wave conductor and enclosing a plug connector for an electrical conductor, said light emitter, a polarizer and a coupler to said sensor light conductor, and further comprising at its output end a similar housing enclosing said measuring beam divider, said analyzers, said quarter wavelength plate, said light receivers and a plug connector for an electrical conductor.

7. An arrangement as defined in claim 6 wherein said light emitter is a laser diode and said light receivers are photodiodes.

* * * * *